United States Patent [19]

Montino et al.

[11] Patent Number: 5,002,909
[45] Date of Patent: Mar. 26, 1991

[54] MIXED OXIDES OF ALUMINA AND ZIRCONIA CONSISTING ESSENTIALLY OF SPHERICAL PARTICLES HAVING A NARROW GRANULOMETRIC DISTRIBUTION AND PROCESS FOR THEIR PREPARATION

[75] Inventors: Franco Montino, Alessandria; Giuseppe Spoto, Turin, both of Italy

[73] Assignee: Montedison S.p.A., Milan, Italy

[21] Appl. No.: 191,818

[22] Filed: May 2, 1988

Related U.S. Application Data

[63] Continuation of Ser. No. 868,746, May 30, 1986, abandoned.

[30] Foreign Application Priority Data

Jun. 4, 1985 [IT] Italy .............................. 21018 A/85

[51] Int. Cl.$^5$ ........................................... C04B 35/10
[52] U.S. Cl. .................................... 501/105; 105/153; 423/626; 423/629; 423/630
[58] Field of Search ................ 501/105, 153; 423/626, 423/629, 630

[56] References Cited

FOREIGN PATENT DOCUMENTS

| 3347450 | 7/1984 | Fed. Rep. of Germany ...... 501/105 |
| 0009875 | 1/1983 | Japan .................................. 501/105 |
| 0032066 | 2/1983 | Japan .................................. 501/105 |
| 881070 | 7/1979 | U.S.S.R. . | |

*Primary Examiner*—Jacqueline V. Howard
*Attorney, Agent, or Firm*—Morgan & Finnegan

[57] ABSTRACT

Mixed oxides of alumina and zirconia having a controlled granulometric distribution, consisting essentially of spherical, submicronic particles, wherein zirconia is distributed uniformly in alumina and may reach 38% by weight, said zirconia being in the stabilized form at room temperature in the tetragonal phase, after having subjected the amorphous hydrated composite oxides to thermal treatments, wherein occurs the transition of zirconia to the tetragonal phase.

20 Claims, 4 Drawing Sheets

MIXED OXIDES OF ALUMINA AND ZIRCONIA CONSISTING ESSENTIALLY OF SPHERICAL PARTICLES HAVING A NARROW GRANULOMETRIC DISTRIBUTION AND PROCESS FOR THEIR PREPARATION

This application is a continuation of application Ser. No. 868,746, filed May 30, 1986 now abandoned.

BACKGROUND OF THE INVENTION

1. Field of the invention

The present invention relates to mixed oxides of alumina and zirconia consisting essentially of spherical particles having submicronic size.

In particular it relates to mixed oxides of alumina and zirconia consisting essentially of spherical, non-aggregated particles, having controlled granulometric distribution.

2. The Prior Art

It is known that alumina, in its different crystalline forms, may be used in various ways, for instance, such as material for electronics, in the preparation of semiconductors substrates and in integrated circuits packing, as ceramic material for the preparation of cutting tools, or as catalyst support in heterogeneous catalysis.

Alumina-based sintered materials do not exhibit, however, very high mechanical strength, for instance, cutting tools made therefrom tend to lose their good characteristics during working.

Furthermore such materials have a low tensile strength as well.

It is well known that the low strength characteristics mostly come from the lack of hardness of the sintered material.

A significant improvement of the aforesaid properties is obtained by using alumina, in its different crystalline forms, in the form of monodispersed or polydispersed, non-agglomerate, spherical particles with narrow granulometric distribution, having a submicronic size or a size up to a few microns.

Several methods are known for obtaining hydrated alumina in the form of spherical particles, such as, for instance, the process described in "Aluminum Hydrous Oxide Sols—II—Preparation of Uniform Spherical Particles by Hydrolysis of Al-sec-Butoxide" P. L. Catone e E. Matijevi , Journal of Colloid Interface Science, Vol. 48, No 2, August 1974, page 291.

A process allowing to obtain hydrated alumina with a very high productivity was described in a preceding patent application of the Applicant. (Italian Patent Application No 19959 A/85).

The hydrated alumina thus obtained can be subjected to thermal treatments in order to obtain gamma-alumina, which retains the same morphologic and granulometric characteristics of the starting precursor. With regard to this, we can cite, for instance, the article of E. Matijevi et al. "Heterogeneous Atmospheric Chemistry Geophysical Monograph Series", vol. 26, pages 44–49 (1982).

Furthermore in another preceding patent application of the Applicant (Italian Patent Application No 19142 A/85), the possibility is described of obtaining alpha-alumina, or mixtures of crystalline phases comprising alpha-alumina with theta-, and/or eta-, and/or delta-alumina consisting essentially of spherical particles which retain the granulometric and morphologic characteristics of the starting precursor.

In fact, it is known that the morphology and the granulometric distribution exert a great influence on the mechanical, thermal, and electrical properties of the materials obtained from said aluminas, in the applications set forth hereinbefore.

Furthermore it was proved that the tensile strength of the alumina may be improved by dispersing zirconia particles in alumina itself. In the article "Preparation of Alumina-Zirconia Powders by Evaporative Decomposition of Solution," Comm. of the Amer. Ceram. Society, May 1984, pages C-92, by D. W. Sproson and G. L. Messing, the authors assert that the strength improvement is due to the presence of zirconia stabilized in the tetragonal phase.

In fact, it is known that zirconia can exist in different crystalline phases, the monoclinic phase up to about 1200° C., the tetragonal phase from 1200° to 2400° C. and the cubic phase at temperatures over 2400° C.

The improvement in the mechanical properties of alumina is obtained only if the zirconia distributed in the aluminum retains the tetragonal form at room temperature and if it does not convert into the monoclinic phase, as having subjected after being the material, based on aluminum oxide, to thermal treatment between 1200° and 2400° C. The alumina should stabilize the zirconia in the tetragonal phase and it should hinder its transition into the monoclinic phase, as the product, after being subjected to thermal sintering treatment is brought to room temperature.

Zirconia stabilization in the tetragonal phase may, however, be only obtained if the crystallite size of zirconia dispersed in alumina ranges within some critical values, usually between 0.2 and 0.6 $\mu$m.

With regard to this we can cite, for instance, the article by E. P. Butler and A. H. Hener, "X-Ray Microanalysis of $ZrO_2$ Particles in $ZrO_2$—Toughened $Al_2O_3$". Communications of the Amer. Ceram. Soc., December 1982, page C-206, or issued European patent application EP 119,028.

The uniform distribution of the zirconia particles in the alumina is essential to obtain the described improvements in mechanical strength and hardness, since it is well known that if zirconia particles are distributed in an non-uniform way, dishomogeneities form in the product, which give rise to cracks during the sintering process. This phenomenon is described for instance in "Processing-Related Fracture Origins III, Differential Sintering of $ZrO_2$, Agglomerates in $Al_2O_3/ZrO_2$ Composite" by F. F. Lange and B. I. Davis, Journal Am. Ceram. Soc. 66 (6), 1983, page 407.

Alumina-zirconia mixed oxides so far known, having the described dispersion characteristics, are not in the form of spherical particles, monodispersed or polydispersed with a low polydispersion index, but they are in the form of agglomerated particles and above all they are lacking in sphericity.

Although the zirconia is uniformly distributed in alumina, the product shows under the electron microscope the lack of any geometric form and indeed it is present in the form of agglomerates.

Therefore in these mixed oxides all the property improvements mentioned hereinbefore are lost, namely the improvements due to sphericity, non-agglomeration and granulometric distribution, as set forth hereinbefore for alumina.

In fact, by using the methods known in the prior art for preparing zirconia -toughened alumina (ZTA), as described hereinbefore, although one works under conditions wherein alumina is obtained in the form of spherical particles by means of the cited processes, alumina-zirconia mixed oxides are obtained which do not present the morphologic and granulometric characteristics of the alumina as such.

Therefore the necessity arises to have mixed oxides of alumina and zirconia which combine the improvements of the strength characteristics of alumina, obtainable by means of zirconia stabilized in the tetragonal form, with these obtainable from alumina in the form of spherical particles and having a narrow granulometric distribution.

THE PRESENT INVENTION

Now we have found, surprisingly, that it is possible to obtain alumina containing zirconia stabilized in the tetragonal phase at room temperature, consisting essentially of non-agglomerate particles having a controlled morphology and a controlled granulometric distribution, which allows one to improve considerably the mechanical, thermal, and electrical characteristics of the alumina given by zirconia.

Therefore an object of the present invention consists essentially of amorphous mixed oxides of alumina and zirconia, in the form of non-agglomerated, submicronic, spherical particles, having a number average diameter ranging between 0.1 and about 1 $\mu$m, having a polydispersion index dw/dn lower than or equal to 2.0, wherein dw is the weight average diameter and dn is the number average diameter, and wherein the zirconia, distributed uniformly in the alumina, is at the most 38% by weight and is stabilized in the tetragonal phase at room temperature, after having subjected said amorphous mixed oxides to thermal treatments for their transformation into crystalline mixed oxides.

The alumina particles comprising zirconia may be mono dispersed or polydispersed.

The term "monodispersed particles" in the present invention means particles of mixed oxides according to the invention, having a polydispersion index indicated by a dw/dn lower than or equal to 1.20, wherein dw is the weight average diameter of the particles and dn is the number average diameter.

The term "polydispersed mixed oxides" according to the invention, means particles having a dw/dn ratio lower than or equal to 2; in particular if dw/dn is lower than or equal to 1.30, the particles are considered as having a low polydispersion index.

Preferably the mixed oxides, according to the invention, have a linear diameter ranging between 0.2 and 0.5 $\mu$m, more preferably between 0.3 and 0.4 $\mu$m. A further object of the invention consists in ZTA, obtained from the amorphous mixed oxides of the invention after thermal treatment. All the possible combinations of the tetragonal phase stabilized at room temperature with the different known crystalline phases of the alumina fall within the scope of the present invention.

In fact, subjecting the mixed oxides according to the invention to known thermal treatments, combinations may be obtained of tetragonal zirconia with alumina in gamma, theta, eta, delta, alpha phase.

Combinations of tetragonal zirconia with alumina in further various crystalline phases, such as gamma-theta, gamma-theta-delta, or delta-alpha phase, may also be obtained.

The zirconia contained in ZTA, is preferably lower than or equal to 25%.

The different zirconia-toughened aluminas according to the invention are characterized, as to the morphologic and granulometric characteristics, by means of a transmission electron microscope (TEM) and as to the determination of the amorphous or crystalline phases of zirconia and alumina by means of X-ray diffraction analysis.

The J.C.P.D.S. standards for the different utilized phases are the following:
gamma-alumina: No 14-425;
alpha-alumina: No 10-173;
delta-alumina: No 16-394;
theta-alumina: No 11-517;
zirconia-tetragonal: No 17-923.

On the products, the size of the zirconia crystallites is determined as well, in order to control if said size is lower than the critical one, above indicated, for obtaining the stabilized zirconia in the tetragonal phase.

The average size D(111) of the crystallites was determined by X-rays according to the Sherrer equation:

$$D(111) = \frac{K \cdot \lambda}{B \cos \nu} \quad (1)$$

wherein
K = constant,
$\lambda$ = wavelength of the radiation,
B = width (by degrees) at half-height of reflection (111),
$\nu$ = Bragg's diffraction angle.

When zirconia is concerned, the equation turns out to be:

$$D(111) = \frac{88.3}{B \cos \nu} \quad (2)$$

The term "average D(111)" means the D(111) value resulting from the measurement of the half-height width of reflection D(111) that appears in the X-ray diffraction spectrum of ZTA calculated according to equation (2).

The X-ray spectrum is carried out by means of a device equipped with a X-ray generator with anode tube made of Cu, by using Cu K alpha radiation, scintillation goniometer, voltage 36 KV, current 18 mA, Ni filter.

The average size of the crystallites D(111) in ZTA turns out to be always much lower than the critical limits for the stabilization of the tetragonal phase; it generally ranges between 150 and 800 Å.

The zirconia-toughened alumina, according to the present invention, may also comprise stabilizers such as, for instance, MgO, NiO, $Y_2O_3$, $Cr_2O_3$, $CeO_2$, CaO. The stabilizers may be used alone or in combination. The amounts that may be used range between and 1 and 10% for $Y_2O_3$, between 3.3 and 4.7% for CaO, between 2.8 and 4% for MgO (all the percentages are by weight).

Similar percentages may be used for the other oxides above cited.

The ZTA aluminas, according to this invention, can be obtained by a precipitation from solutions by using polyelectrolytes as indicated hereinafter.

In fact, a further aspect of the invention, consists in a process for preparing amorphous mixed oxides of alumina and zirconia, according to the invention, starting from aqueous solutions comprising an alumina salt, the $Al^{3+}$ concentrations being up to 0.3 moles/l, preferably 0.2 moles/l, said aluminum salt coming, for at least 80% by weight of the total Al present in the system, from aluminum sulphate, a zirconium salt soluble under the reaction conditions, the $Zr^{4+}$ concentration being such as to reach at the most 38% by weight as $ZrO_2$ calculated on the $Al_2O_3$ and $ZrO_2$ weight of the product subjected to calcination at 1000° C. for 2 hours and, by carrying out the precipitation of the hydrated mixed oxides of alumina and zirconia in the presence of cationic poly-electrolytes, soluble under the reaction conditions, having an average molecular weight higher than 1 million and ionicity of at least 3 milliequivalents/g (meq/g), said precipitation being carried out under such conditions as to obtain a homogeneous precipitation in the presence of substances capable of releasing $OH^-$ ions and furthermore by working in the presence of $H_2SO_4$ in such amounts as to redissolve the precipitate which occurs during the preparation of the starting solution at room temperature.

An alternative way consists in preparing the starting solution by adding to the aluminum salt under the reaction conditions the polyelectrolyte and the basifying substance capable of releasing $OH^-$ ions, in acidifying the solution up to at least pH 3, and afterwards in adding the zirconium salt and a sulphate.

The sulphate is added in an equimolar amount with respect to the sulphuric acid used in the method indicated hereinbefore.

In this case, however, lower amounts of sulphate may be used as well, depending on the used amount of zirconium.

A person skilled in the art will be able to determine easily the lowest amount of sulphate, at the different concentrations of zirconium used, in order to obtain hydrated mixed oxides of aluminum and zirconium, according to the invention, having a spherical morphology and the indicated granulometric distribution.

The cationic polyelectrolytes have preferably an ionicity higher than 3.5 meq/g and a molecular weight ranging between 3 and 6 millions.

The polyelectrolytes of the invention are used in amounts higher than 2.5% by weight with respect to the theoretical amount of $Al_2O_3$ corresponding to the starting aluminum present in the solution.

Preferably amounts of polyelectrolyte are used higher than 3% by weight, in particular 3.3% by weight.

The polyelectrolytes of the invention, before being used, are dissolved preferably in water in concentrations of a few g/l, usually of about 1 or 2 g/l.

Amounts of polyelectrolyte may be used higher than those indicated hereinbefore, for instance about 7 or 20% by weight; in this case no significant variation is obtained as to the morphology and the granulometric distribution of the particles up to about 7.5% by weight. If an amount of polyelectrolyte higher than 7.5% by weight is used, a decrease of the particle diameter is obtained; for instance for concentrations of 20% by weight of polyelectrolyte the diameter changes from 0.3 μm to 0.2 μm.

Usually higher concentration of polyelectrolyte may be used as well, provided that under the reaction conditions the polyelectrolyte does not separate into a phase different from the aqueous phase. In this case the effect on the diameter decrease is more pronounced.

The ionicity of the polyelectrolytes according to the invention is related to the number of cationic groups distributed on the whole length of the polymeric chain.

In order to obtain the results according to the invention, the cationic groups have to be distributed regularly on the polymeric chain, as their grouping on only on a few zones of the chain leads to a decrease in the polyelectrolyte activity.

We have found that the best results are obtained with concentrations of ionic groups corresponding to at least 3 meq/g. The amount of cationic groups is preferably higher than 4 meq/g.

The quantitative determination of the ionicity of the cationic polyelectrolyte is carried out according to known methods, by using an anionic polyelectrolyte as titrant. The method used in the present process is set forth in "Polyelectrolyte Determination at Low Concentration," L. K. Wang and W. W. Shuster, Ind. Eng. Chem., Prod. Res. Dev., Vol. 14, No 4, 1975, pages 312–314, and it allows one to calculate the milliequivalents per g. (meq/g) of positive charge present in the polyelectrolyte.

The anionic polyelectrolyte used as titrant is a commercial product, named PVSAK, consisting of the potassium salt of polyvinylsulphonic acid.

Furthermore we have found that the more nearly linear is the polyelectrolyte structure, the better is change its performance. Molecular weight being the same, a polyelectrolyte having a branched structure presents a lower activity. However, branched cationic polyelectrolytes may be used as well, provided that they are soluble under the reaction conditions and are introduced in greater amounts.

The polyelectrolytes, which proved to be particularly suitable for the process according to the present invention, are polymers comprising repeating unit based on substituted acrylamide having general formula:

wherein $R_1$, $R_2$, $R_3$, T are equal or different from each other and are selected from the group consisting of H; aliphatic hydrocarbon radical having from 1 to 4 carbon atoms;

Y is H or $-CH_3$;

Z is H or $-CH_3$;

X is an anion, in particular chloride or sulphate;

n is an integer.

The polymers comprising the above mentioned unit are obtained from nonionic polyacrylamide by means of known reactions, for instance through the Mannich reaction.

Other cationic polyelectrolytes, that may be used are polyvinylamines, which may be obtained from the polyacrylamides through the Hoffmann degradation reaction and subsequent quaternization of the nitrogen atom, according to known techniques, or through polymerization according to known processes of the vinylamines and subsequent nitrogen quaternization, having the general formula;

$R_4$, $R_5$, $R_6$ have the same meaning as $R_1$ as above indicated; and X, Y and n have the meaning specified hereinbefore.

The preferred compounds are those wherein: Y, Z, T, $R_3$ and $R_4$ are H and $R_1$, $R_2$, $R_5$, $R_6$, equal or different from each other, are selected from the group consisting of H, —$CH_3$ and —$C_2H_5$.

The polymers comprising the indicated cationic units may also contain neutral units of non-substituted acrylamide having the formula:

wherein m is an integer and wherein Y has the above meaning.

The neutral and cationic units are statistically distributed along the polymer chain, ionicity and molecular weight assuming the given values.

Use may be also made, however, of copolymers wherein the neutral unit may be selected among the following:

(a1)

wherein R=H or an aliphatic hydrocarbon radical containing from 1 to 4 carbon atoms;

(a2)

wherein $R_7$ has the same meaning of R;

(a3)

wherein $R_8$ has the meaning of R;

(a4)

wherein $R_9$ and $R_{10}$ have the meaning of R;

(a5)

units coming from the polyvinylpyridines;
m in the different classes has the meaning as given hereinbefore.

The copolymers containing the cationic unities of acrylamide and the indicated neutral groups are obtained according to processes known to the prior art.

In particular, the polymers comprising the indicated ionic units and the groups of class (a1) are obtained through polymerization of a $CH_2$=CHR olefin with acrylamide; the ones of class (a2) through polymerization of acrylamide with an ester of acrylic acid; the ones of class (a3) through copolymerization of vinylether with acrylamide; the ones of class (a4) through copolymerization of maleic acid with acrylamide; the ones of class (a5) through copolymerization of acrylamide with vinylpyridine.

The different neutral units indicated in the different groups may be also present contemporaneously in the polymeric chain, if more monomers are polymerized at the same time, provided that the values of molecular weight and ionicity, indicated hereinbefore, are always retained.

The combinations of the different radicals that appear in the neutral and cationic groups indicated hereinbefore, are, however, selected in such a way that they lead to soluble polymers under the conditions employed.

In particular, in the different classes one prefers the hydrocarbon radicals having 1 or 2 carbon atoms.

The polyelectrolytes of the class of polyacrylamides are commercial products named Ecoclar, Praestol, Separan which are available both in the solid state and in emulsion.

Preferably they are utilized by preparing aqueous solutions of the commercial polyelectrolyte at concentrations of 1-4 g/l at the time of their use and by drawing the necessary amount. In fact, the aqueous solutions of these electrolytes are stable for a short time, usually for a few days only.

The homogeneous precipitation is carried out by introducing into the reaction medium substances capable of releasing $OH^-$ in a gradual and uniform way so that local oversaturations of the solution may be avoided.

Any substance may be used, capable of releasing $OH^-$ ions as indicated hereinbefore. Urea and formamide, for instance, may be cited as preferred compounds. In the process according to the invention one works at temperatures at which the substance is capable of releasing $OH^-$. However, to obtain quantitative yields in hydrated alumina comprising zirconia in a short time, it is necessary to work at such temperature at which the release of $OH^-$ occurs as quickly as possible.

Urea, for instance, starts to release $OH^-$ ions already at relatively low temperatures, at about 60° C. However, by working at temperatures of about 80° C. as well, quantitative yields in alumina comprising zirconia may be obtained in a exceedingly long time, of about several hours, or it should be necessary to use a very high amount of urea with consequent increase in the costs and difficulties in solubilization both of urea and of polyelectrolyte to obtain homogeneous solutions.

One prefers to work at temperatures ranging between 90° and 100° C. in order to complete the precipitation in a very short time and to avoid possible decomposition of the polyelectrolyte as well.

Under these conditions, use may be made of molar ratios urea/Al higher than or equal to 10; preferably higher than 13. Under these conditions the times required for a quantitative precipitation of the composite hydrated oxide of the invention amounts to a few hours; usually it ranges between 1 and 4 hours and the size of the spherical particles turns out to be practically independent of the ratios used.

It is possible to work at atmospheric pressure or under pressure, in the latter case the time is further lowered.

As aluminum salt use is made of the sulphate. Use may be also made of mixed sulphates such as for instance the potassium, sodium and ammonium sulphates.

Usually a mixture of these aluminum salts may be used as well; it is also possible to work in the presence of an excess of sulphate ions, obtained by addition for instance of sodium, ammonium or potassium sulphate.

Mixtures may also be used of aluminum sulphate with aluminum nitrate, chloride, perchlorate, acetate, formate, provided the $Al^{3+}$ amount coming from the salts, which differ from sulphate, is about 5–10%, generally not higher than 20% by weight, as compared with the total aluminum that has been introduced.

As zirconium compound, any compound may be used provided it is soluble under the reaction conditions. For instance we may cite $ZrOCl_2$, sulphate, nitrate; preferably use is made of $ZrOCl_2$ or of sulphate.

As sulphates to be used, if no use is made of $H_2SO_4$ in order to dissolve the precipitate again, but if one works with acidified starting solutions at a pH lower than 3, we may cite $Na_2SO_4$, $(NH_4)_2SO_4$ $K_2SO_4$, or a composite sulphate.

The order of addition of the reactants does not affect the morphologic and granulometric characteristics of the final mixed oxide.

One prefers, however, to use the above mentioned method consisting in acidifying the starting solution containing the $Al^{3+}$ salt, urea, polyelectrolyte up to pH<3 in order to avoid that the addition of the zirconium salt causes the formation of a filamentary precipitate that does not dissolve by heating, and afterwards in adding the $SO_4^-$ amount, as indicated hereinbefore. Should the other method be used, namely without previous acidification, the filamentary precipitate may be treated with acids, such as HCl or $H_2SO_4$, in order to be dissolved again. However, by working according to the latter case, the precipitate may be dissolved again with rather some difficulty.

The hydrated mixed oxides of the invention appear in the amorphous form under X-ray powder analysis.

Crystalline mixed oxides, having the same morphology and granulometric distribution as the amorphous mixed oxides of the invention, may be obtained by subjecting the hydrated mixed oxides of the invention to thermal treatments according to known processes. By carrying out a particular thermal treatment, as described in a preceding patent application of the Applicant (Italian Patent Application No 19142 A/85), the alpha phase of alumina may also be obtained, having the same granulometric and morphologic characteristics as the amorphous precursor.

The average size (dw and dn) and the morphologic and granulometric characteristics are determined by TEM analysis. The method for determining dw and dn is described by E. A. Collins, J. A. Davidson and C. A. Daniels in "Review of Common Methods of Particles Size Measurement", Journal of Paint Technology, vol. 47, No 604, May 1975.

By the process of this invention high productivities are obtained, usually of about 10 g/l. hour or even higher.

The composite oxides obtained by the process of the invention turn out to be very pure. The greatest impurity that, desirably, should be as low as possible, is due to sulphur coming from the use of sulphates, which are necessary to obtain the results of the process, of the invention.

However, there are several methods suitable to for eliminating this impurity.

In particular we have found that the sulphur amount depends, in a considerable way, on the final pH of the suspension at the end of the precipitation.

If the solution of $Al^{3+}$ and $Zr^{4+}$ is heated in the presence of urea at a temperature of about 100° C., a slow but progressive increase of pH is noted, from the starting value, usually about 1, up to values about 3–3.5. During this phase a precipitate forms that consists of hydrated alumina comprising zirconia; successively a quick increase of pH is noted up to values of 4.5–5.5; afterwards the pH increase rate becomes considerably lower. At a pH value of about 4 the $Al^{3+}$ and $Zr^{4+}$ precipitation has to be considered as complete and therefore at this point the precipitate may be separated from the mother liquor by any technique suitable to this purpose, such as for instance centrifugation or filtration.

Although the $Al^{3+}$ and $Zr^{4+}$ precipitation is already over at pH 4, one prefers sometimes to reach pH values higher than 4, as we have found that the higher the suspension, pH of the higher the purity, referred to the sulphur content of the precipitated composite hydroxides.

Obviously it is possible to let the pH rise further by extending the heating time in the presence of urea; the same effect can, however, be obtained by adding alkali directly to the suspension. In fact, as at pH 4 the $Al^{3+}$ and $Zr^{4+}$ precipitation is over, the alkali addition does not cause at this point any phenomenon of uncontrolled nucleation, but only an increase of the pH of the suspension. The final pH should not be over 6, since higher pH values give rise to phenomena of particle agglomeration and loss of sphericity.

The sulphur content in the hydroxide can be further lowered, by suspending said hydroxide, after having removed the mother liquors, in alkaline solutions, at a pH ranging between 8 and 9.5 and at a temperature ranging between 15° and 50° C.

Solutions containing 1–3% by weight of $NH_4HCO_3$ prove to be alkaline solutions advantageous to this purpose, when an ammoniacal solution is added to these solutions in such amount that the pH suspension of the hydrated composite oxide reaches the selected value.

The obtained final sulphur, after the described treatment, reach values <1% by weight.

Moreover the sulphur content may be further lowered by carrying out thermal treatments.

We have found, however, that the almost total elimination of sulphur may be obtained if the amorphous hydrated composite oxide, used as precursor of the crystalline phases of the corresponding oxides, contains a sulphur amount that is as little as possible.

A few examples are given hereinafter only by way of illustration but not of limitation of the present invention.

EXAMPLE 1

0.6 g of a commercial polyelectrolyte, Ecoclar 8017, having a molecular weight of 3–4 millions and a positive ionicity, measured by titration with PVSAK, of 4.94 milliequivalents/g (meq/g), were dissolved, under stirring, in 330 ml of $H_2O$.

Then 190 ml were added of a solution containing 200 g/l of $Al_2(SO_4)_3.18\ H_2O$ (0.6 moles/l of $Al^{3+}$), 13 ml of concentrated $H_2SO_4$ (96%), 96 g of urea, and finally 10 ml of a solution containing 171.73 g/l of a $ZrOCl_2.6\ H_2O$ (0.6 moles/l.). The final volume of the solution was about 600 ml.

The solution was then poured into a 1 l flask, equipped with reflux cooler, thermometer and electrode for the pH measurement and heated, without stirring, to 100° C.

The pH increased from 1.3 to 5.5 over about 135 minutes: at about pH 3.4 an opalescence appeared whose intensity increased quickly while the pH increased.

Figure 1:
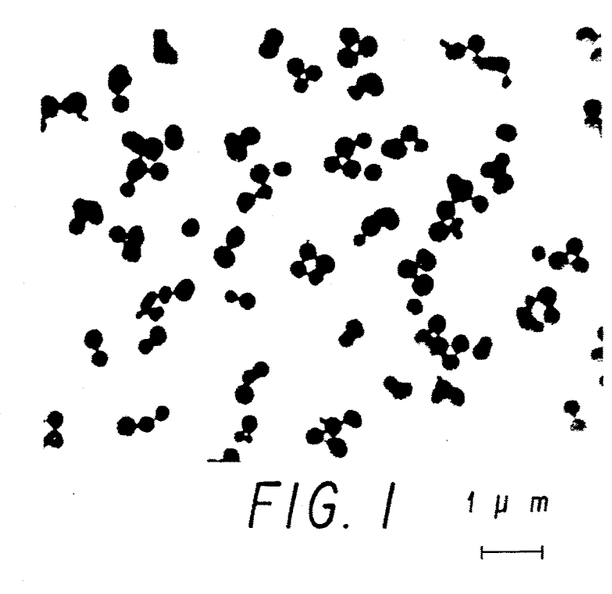
FIGS. 1, 3, 4, 6, 7 and 8 are photographs of the products obtained according to Examples 1, 2, 3, 6, 15 and 20, respectively.

The obtained precipitate, after having been filtered, was washed and dried at 120° C. over a few hours. 12.5 g of hydrated mixed oxide of aluminum and zirconium were obtained; under TEM analysis such compound consisted essentially of spherical, uniform and nearly monodispersed particles (dw/dn = 1.19) having an average diameter equal to 0.3 μm. A photograph of the sample at a magnification of 9700 X is set forth in FIG. 1.

The X-ray powder spectrum showed that the sample was amorphous.

Under the example conditions total $[SO_4^{2-}]/[Zr^{4+}]=67.5$; $ZrO_2$ represented 11.30% by weight (nominal) of the final product.

Comparative EXAMPLE 1

13 ml of 96% $H_2SO_4$, 330 ml of a solution containing 96 g of urea, and 10 ml of a solution containing 171.73 g/l of $ZrOCl_2.6\ H_2O$ (0.6 moles/l of Zr) were added to 190 ml of a solution containing 200 g/l of $Al_2(SO_4)_3.18\ H_2O$ (0.6 moles/l of $Al^{3+}$). One heated, without stirring, to 100° C.; at such temperature the pH was 1.4.

After heating over 85 minutes, at about pH 3.7, appearance was noted of a turbidity, whose intensity increased quickly. After heating for 120 minutes, when the pH was 5.6, the obtained precipitate was filtered, washed and then dried at 120° C. for a few hours.

Figure 2:
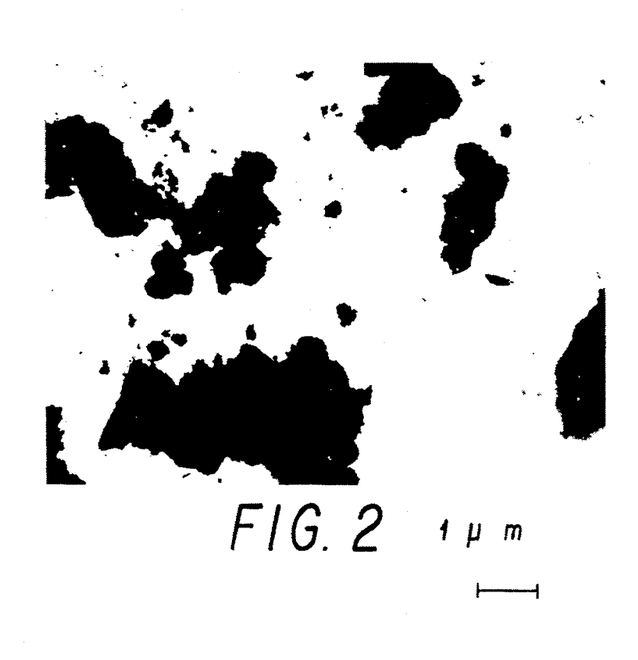
FIGS. 2 and 5 are photographs of the products prepared according to comparative Example 1 and (comparative) Example 4, respectively.

12.3 g were obtained of a product which, under X-ray analysis, consisted of particles which had different sizes, and were agglomerated and lacking of well defined morphologic characteristics. (FIG. 2, 9700 ×). In particular, the presence of spherical particles was not noted.

EXAMPLE 2

0.3 g of Ecoclar 8017 were dissolved in 330 ml of $H_2O$, under stirring. One added 200 ml of a solution containing 200 g/l of $Al_2(SO_4)_3.18\ H_2O$ and 96 g of urea. Then the solution was heated to 100° C., without stirring, till the pH reached the value of 5.5. The TEM analysis of the precipitate indicated that it consisted essentially of spherical particles having an average diameter of 0.5 μm and dw/dn = 1.28.

Figure 3:
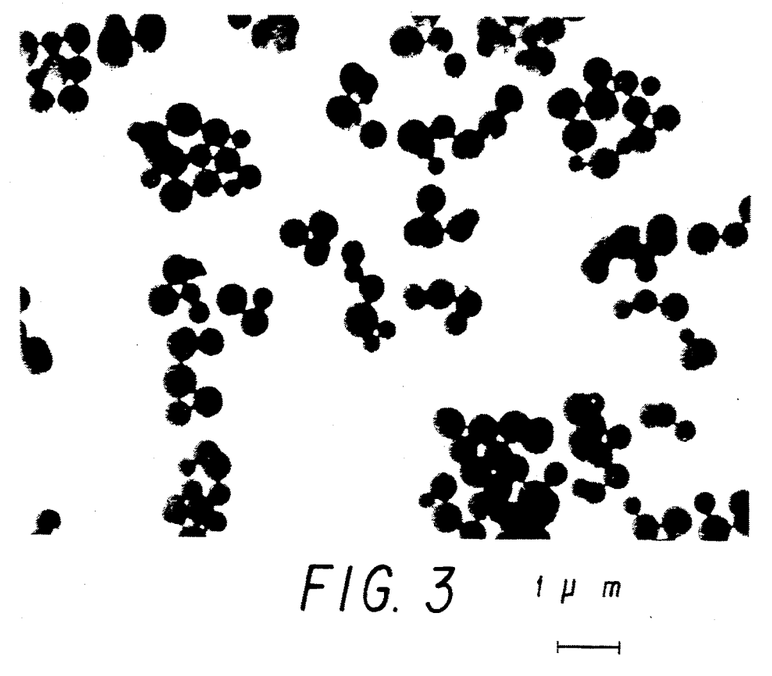

A TEM photograph of the obtained product is set forth in FIG. 3 (magnification 9700 X).

EXAMPLE 3

180 ml of a solution containing 200 g/l of $Al_2(SO_4)_3.18\ H_2O$, 18 ml of 96% $H_2SO_4$, 96 g of urea, and 20 ml of a solution containing 171.73 g/l of $ZrOCl_2.6\ H_2O$ were added to 0.6 g of Ecoclar 8017 dissolved, under stirring, in 330 ml of $H_2O$. The solution was heated up to 100° C., by using the apparatus described in Example 1.

At the start the pH value was 1.6 and it reached the value 3.3 after 80 minutes. At this point the appearance was noted of a slight opalescence whose intensity increased quickly while the solution acidity lessened. When after about 135 minutes the pH reached value 5.5, the formed precipitate was filtered, washed and then dried in an oven at 120° C.

13.60 g of a product were obtained which, under X-ray analysis, turned out to be amorphous and under TEM analysis turned out to consist essentially of spheroidal, uniform particles, having a narrow granulometric dispersion and an average diameter of about 0.25 μm.

Under the reported conditions, $[SO_4^{2-}]/[Zr^{4+}]=40.5$, whereas the $ZrO_2$ was, nominally, 21.20% by weight.

Figure 4:
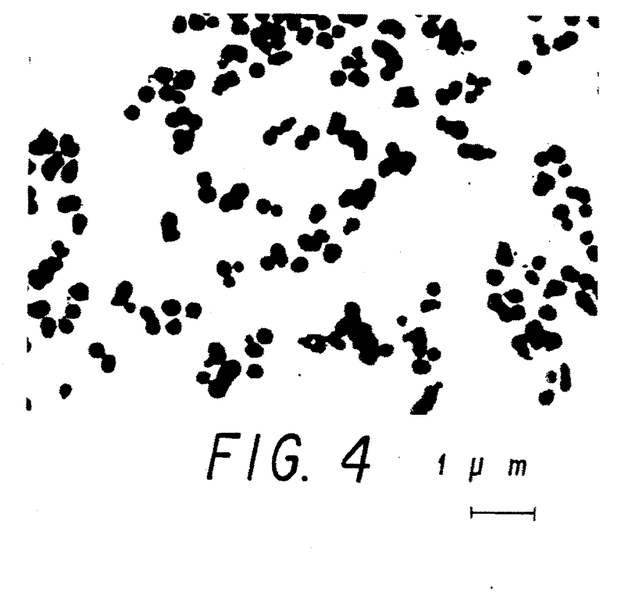

A photograph of the sample at a magnification of 9700 × is set forth in FIG. 4.

EXAMPLE 4

(Comparative example)

A comparison test with Example 3 was carried out, while keeping unaltered all the conditions, but while replacing the solution of $Al_2(SO_4)_3.18\ H_2O$ with 180 ml of a solution containing 21.14 g/l of $(NH_4)_2.SO_4$: in such a way the ratio: total $[SO_4^{2-}]/[Zr^{4+}]$ remained unchanged, pH changed from 2.0 to 5.5, by heating at 100° C. for 85 minutes; at pH=3.2 one began noting the formation of a precipitate which, after having been filtered and washed, was dried at 120° C.

Figure 5:
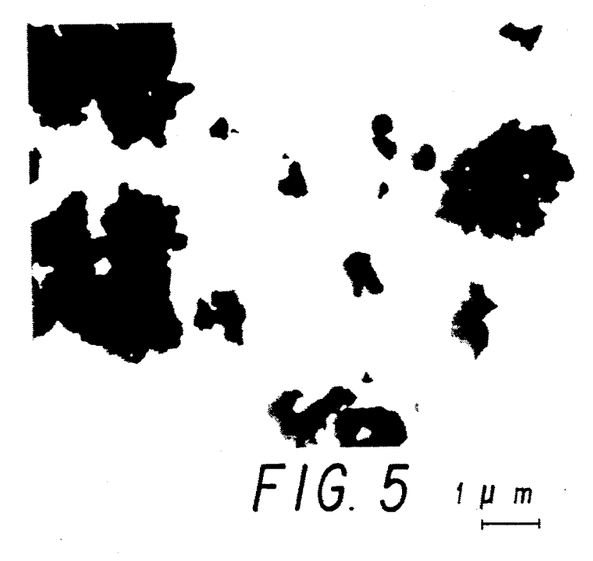

2.45 g were obtained of hydrated zirconium oxide, a photograph of which is shown in FIG. 5, at an magnification of 9700 ×. The presence is noted of agglomerated, non-spherical particles, which are very different from those of Example 3, from a morphological point of view.

EXAMPLE 5

The test described in Example 3 was repeated, with the only variant being that 0.3 g (0.5 g/l) of Ecoclar 8017 were used. The TEM analysis showed that the product still consisted of spheroidal particles which had a diameter slightly higher than the ones of Example 3 (about 0.4 μm) and were a little more agglomerated.

EXAMPLE 6

Figure 6:
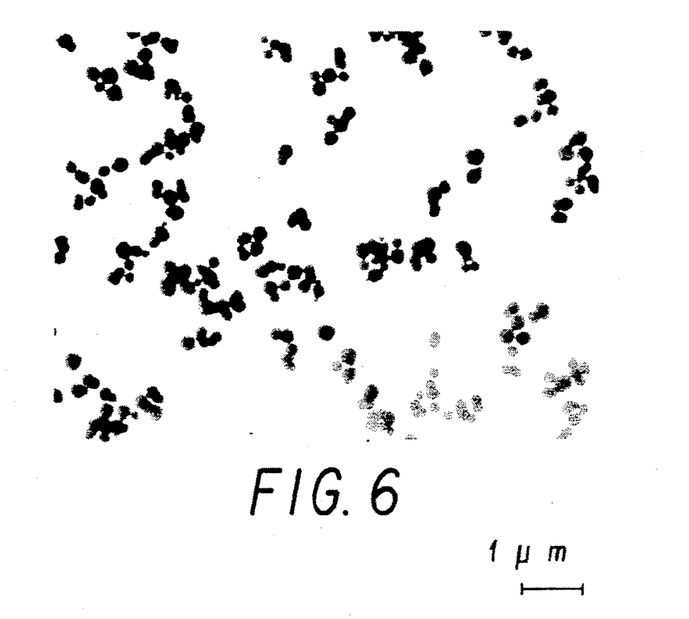

The test described in Example 3 was repeated by using 1.2 g (2 g/l) of Ecoclar 8017. At TEM examination the obtained product, a photograph of which is set forth in FIG. 6 with an magnification of 9700 × proved to consist of uniform spheroidal particles, that were slightly agglomerated, and had a narrow granulometric dispersion and an average diameter equal to 0.2 μm.

EXAMPLE 7

The test of Example 3 was repeated with the only variant being that 48 g of urea were used instead of 96 g. The pH increase by heating to 100° C. turned out to be, in this case, much slower, so that only after 200 minutes was the pH value over 1.6. By carrying on the reaction over 6 hours up to pH 5.5 a hydrated mixed oxide was obtained having the same characteristics as that of Example 3.

EXAMPLE 8

The test described in Example 3 was repeated by using 20 ml of a solution containing 0.6 moles/l of $Zr(SO_4)_2.H_2O$ instead of $ZrOCl_2.6\ H_2O$. Total $[SO_4^{2-}]/[Zr^{4+}]=43.3$ The obtained precipitate, after having been dried at 120° C. (14 g), did not show, either from the morphologic point of view, or from the granulometric point of view, substantial differences, as compared with that of the test of Example 3.

EXAMPLE 9

180 ml of a solution containing 200 g/l of $Al_2(SO_4)_3.18\ H_2O$, 96 g of urea, and 42.82 g of $(NH_4)_2SO_4$ were added to 0.6 g of Ecoclar 8017 dissolved, under stirring, in 300 ml of $H_2O$. The solution pH, that turned out to be 3.5, was brought to 2.8 by means of 0.5 ml of $H_2SO_4$, then 20 ml were added of a solution containing 171.73 g/l of $ZrOCl_2.6\ H_2O$ and the volume was brought to 600 ml by means of $H_2O$. Under these conditions total $[SO_4^{2-}]/[Zr^{4+}]=40.1$.

By heating to 100° C. in the apparatus described in Example 1, the pH increased from 2.63 to 5.5 over 55 minutes. The obtained precipitate did not present, at TEM analysis, any substantial difference, as to morphology and granulometry of the particles forming said precipitate, as compared with that obtained in the test described in Example 3.

EXAMPLE 10

A test was carried out according to the operative conditions described in Example 6, except that a rotor blade stirrer, having a speed of 260 RPM, was added to the described apparatus. The TEM analysis of the obtained precipitate showed that neither morphology, nor granulometric distribution of the particles forming said precipitate was affected.

EXAMPLE 11

One dissolved, under stirring, 0.6 g of Ecoclar 8017 in 200 ml of $H_2O$ and one added 170 ml of a solution containing 200 g/l of $Al_2(SO_4)_3.18\ H_2O$, 176 ml of a solution containing 96 g of urea, 23.5 ml of 96% $H_2SO_4$ and 30 ml of a solution containing 171.73 g/l of $ZrOCl_2.6\ H_2O$.

By heating to 100° C., the pH changed from 1.8 to 5.5 over 170 minutes and a precipitate formed that, after filtration, washing and drying at 120° C., turned out to consist, under TEM analysis, of particles having characteristics similar to these described in the preceding examples.

Under the above mentioned conditions $ZrO_2$ (nominal) represented 29.3% by weight; furthermore the total ratio $[SO_4^{2-}]/[Zr^{4+}]$ turned out to be equal to 31.6.

X-ray powder spectrum showed that the product was amorphous.

EXAMPLE 12

The test described in Example 11 was repeated by using 2.5 ml of 96% $H_2SO_4$ instead of 23.5 ml.

Under these conditions total $[SO_4^{2-}]/[Zr^{4+}]=11$.

The TEM analysis of the obtained product showed that it consisted of polydispersed, agglomerated and morphologically heterogeneous particles: but, the presence of spherical particles was not observed.

EXAMPLE 13

One dissolved 1.2 g of Ecoclar 8017 in 350 ml of $H_2O$ and then one added 96 g of urea, 27 cc of 96% $H_2SO_4$, 160 ml of a solution containing 200 g/l of $Al_2(SO_4)_3.18\ H_2O$ and 40 ml of a solution containing 171.73 g/l of $ZrOCl_2.6\ H_2O$.

At the end of the test that was carried out according to the already-described method, 14.58 g were obtained of a precipitate, consisting of spheroidal particles having an average diameter of 0.2 μm.

X-ray powder spectrum showed that the sample was amorphous.

Under the test conditions, the $ZrO_2$ concentration (nominal) was equal to 37.7% by weight; the total ratio $[SO_4^{2-}]/[Zr^{4+}]$ was 26.25.

EXAMPLE 14

Example 11 was repeated but use was made of a molar total ratio $[SO_4^{2-}]/[Zr^{4+}]=40$, by utilizing $(NH_4)_2SO_4$ to reach this value.

The obtained product showed the same morphologic and granulometric characteristics as that of Example 11.

EXAMPLE 15

18 ml of 96% $H_2SO_4$, 96 g of urea, 140 ml of a solution of 0.3 M $Al_2(SO_4)_3.18\ H_2O$, and 60 ml of a solution of 0.6 M $ZrOCl_2.6\ H_2O$ were added to 0.6 g of Ecoclar 8017 dissolved in 330 ml of $H_2O$.

Under these conditions the nominal concentration of $ZrO_2$ was 50.89% by weight and total $[SO_4^{2-}]/[Zr^{4+}]=12.5$.

The test was over (pH=5.5) after heating at 100° C. for 115 minutes. After drying of the obtained precipitate (14.9 g), the product analysed at TEM turned out to consist of particles having a very irregular morphology, but such particles were not spherical and were partly agglomerated.

Figure 7:
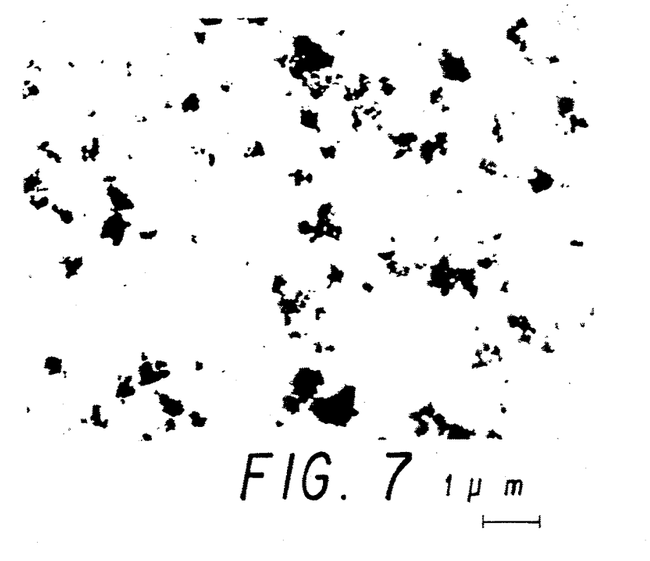

A photograph of the sample at an enlargement of 9700 X is set forth in FIG. 7.

EXAMPLE 16

The product obtained in Example 3 was subjected to thermal treatment at 900° C. for 60 minutes. The obtained product analysed at TEM showed that the particles remained spherical and that the presence of agglomerates was not noted.

Morphology was maintained, the particle diameter tuned out to be 10% lower, as compared with that of Example 1. X-ray powder spectrum showed the presence of gamma and delta $Al_2O_3$ and $ZrO_2$ in the tetragonal crystalline phase.

EXAMPLE 17

Example 16 was repeated, while carrying out thermal treatment at 700° C. for 3 hours. Use was made of a diagram of heating slope of 250° C./hour. The particles remained spherical with a diameter decrease of 5%, as compared with the product of Example 3. The presence of agregate was not noted and the granulometric distribution was unvaried as compared with Example 16.

X-ray powder spectrum of the thus treated sample showed that $ZrO_2$ was in the tetragonal phase and $Al_2O_3$ in the gamma phase.

EXAMPLE 18

Example 17 was repeated, by carrying out the thermal treatment always at the same temperature and over the same period of time, with the only variant that the sample was introduced directly into the oven from room temperature to treatment temperature.

The results were similar to those of Example 17.

EXAMPLE 19

The product obtained after treatment of Example 16, was subjected to a thermal treatment at 1140° C. for 15 minutes. Use was made of a diagram of instantaneous heating slope as that used in Example 18. The product maintained the same morphological characteristics as that of Example 16. This product, analysed at X-rays, turned out to consist of a mixture of delta-and theta-$Al_2O_3$ and of $ZrO_2$ in the tetragonal crystalline phase.

The yield as obtained of crystalline mixed oxide turned out to be about the theoretical one (98%), as compared with the amorphous precursor obtained in Example 3.

The average size of the $t.ZrO_2$ crystallites drawn from the X-ray spectra turned out to be 245 Å.

EXAMPLE 20

Figure 8:
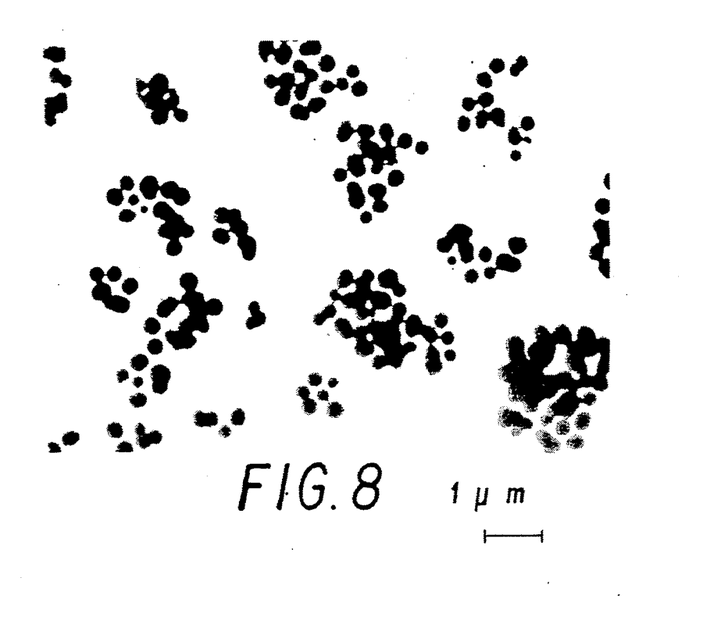

The product obtained in Example 1 was subjected to the same thermal treatment as set forth in Example 16. Morphology and granulometric distribution of the particles were like to the that of Example 1. The particle diameter was reduced by about 8%. A photograph taken under TEM, of the sample obtained at a magnification of 9700 X is set forth in FIG. 8.

X-ray powder analysis showed the presence of the same crystalline phases of Example 16 as to $Al_2O_3$; $ZrO_2$ was present in the tetragonal phase.

EXAMPLE 21

The obtained product in Example 20 was subjected to thermal treatment at 1250° C. for 30 minutes: X-ray analysis showed the presence of $Al_2O_3$ in the alpha phase and of $ZrO_2$ in the tetragonal phase.

The average size of the $t.ZrO_2$ crystallites drawn from the X-ray spectra turned out to be 365 Å.

The yield in obtained crystalline composite oxide turned out to be about the theoretical one, as compared with the amorphous precursor obtained in Example 1.

EXAMPLE 22

Example 1 was repeated, while using 0.6 g of Ecoclar 8337, a cationic polyelectrolyte having an average molecular weight of 4-5 millions, ionicity of 4.99 meq./g.

The precipitated mixed-oxide had characteristics similar to those of Example 1.

EXAMPLE 23

Example 22 was repeated, while using 0.6 g of Praestol 444 K, a cationic polyelectrolyte having an average molecular weight of 4 millions and ionicity of 4.24 meq./g.

The precipitated mixed oxide had characteristics similar to the one of Example 1.

EXAMPLE 24

Example 22 was repeated, while using 0.6 g of Praestol 334 K, a cationic polyellectrolyte having an average molecular weight of 3 millions and ionicity of 3.97 meq/g.

The obtained composite oxide had characteristics similar to the ones of Example 1.

What is claimed is:

1. Amorphous mixed oxides of alumina and zirconia, consisting essentially of spherical, submicronic, non-agglomerated particles, having average diameter ranging between 0.2 and about 1 micron, having a polydispersion index dw/dn lower than or equal to 2.0, wherein dw is the weight average diameter and dn is the number average diameter, and wherein the zirconia is uniformly distributed in the alumina, said zirconia being at the most 38% by weight and being stabilized in the tetragonal phase at room temperature, after having subjected said amorphous mixed oxides to thermal treatment for converting zirconia to the tetragonal phase.

2. Amorphous mixed oxides of alumina and zirconia, according to claim 1, wherein dw/dn is lower than or equal to 1.30 and the number average diameter of the particles ranges between 0.2 and 0.5 μm.

3. Amorphous mixed oxides of alumina and zirconia, according to claim 2, wherein dw/dn is lower than or equal to 1.20 and the average diameter of the particles ranges between 0.3 and 0.4 μm.

4. Mixed oxides of alumina and zirconia obtained by subjecting to thermal treatment the amorphous hydrated mixed oxides of claim 1, wherein zirconia is stabilized in the tetragonal crystalline form and alumina is in a crystalline phase selected from the group consisting of gamma, alpha, theta, delta, and eta phases and mixtures of such phases.

5. Mixed oxides, according to claim 4, wherein the percentage of zirconia distributed in the alumina is lower than or equal to 25% by weight.

6. Mixed oxides according to claim 5, wherein the percentage of zirconia is lower than or equal to 11% by weight.

7. In a process for the improved homogeneous precipitation of amorphous mixed oxides of zirconia and alumina comprising the steps of (a) mixing an aluminum and zirconium aqueous salt solution with a substance which gradually releases hydroxy ions under heating, and with sulphuric acid in such an amount as to prevent formation of a precipitate during the preparation of the mix, said aqueous solution comprising the aluminum salt in an $Al^{3+}$ concentration of up to 0.3 moles/l, at least 80% by weight of said aluminum salt being derived from aluminum sulphate, and a zirconium salt soluble, under precipitation conditions, under the reaction conditions in a $Zr^{4+}$ concentration of at the most 38% by weight as $ZrO_2$ calculated on the weight of $Al_2O_3$ and $ZrO_2$ of the product after calcinating at 1000° C. for two hours, and (b) homogeneously precipitating a mixed oxide, the improvement comprising carrying out the precipitation of the mixed oxides in the presence of soluble, under precipitation conditions, cationic polyelectrolytes, having an average molecular weight higher than 1 million and an ionicity of at least 3 milliequivalents/g, said amorphous mixed oxide consisting essentially of spherical, submicronic, non-agglomerated particles having an average diameter ranging between 0.2 and about 1 micron, having a polydispersion index dw/dn lower than or equal to 2.0, where dw is the weight average diameter and dn is the number average diameter, and wherein zirconia is uniformly distributed in alumina, said zirconia being at the most 38% by weight and being stabilized in the tetragonal phase at room temperature, after having subjected said amorphous mixed oxides to thermal treatment for converting zirconia into the tetragonal phase.

8. A process for the preparation of mixed oxides of alumina and zirconia, according to claim 7, wherein the $Al^{3+}$ concentration is 0.2 moles/l.

9. A process according to claim 7, wherein the cationic polyelectrolyte has ionicity higher than 3.5 meq/g and an average molecular weight of 3 millions.

10. A process according to claim 7, wherein the cationic polyelectrolyte is used in amounts higher than or equal to 3.3% by weight, as compared with the theoretical alumina corresponding to the starting aluminum present in the solution.

11. A process, according to claim 10, wherein the cationic polyelectrolyte is used in amounts higher than or equal to 10% by weight.

12. A process, according to claim 7, wherein the cationic polyelectrolyte comprises repeating units based on substituted acrylamide, having the formula:

wherein $R_1$, $R_2$, $R_3$, T, equal or different from each other are selected from the group consisting of hydrogen and a hydrocarbon radical having from 1 to 4 carbon atoms;

Z, Y=CH$_3$, H

X is an anion, and n is an integer.

13. A process, according to claim 12, wherein Y, Z and $R_3$ are H, and $R_1$ and $R_2$ equal or different from each other are selected from the group consisting of H, —CH$_3$ and —C$_2$H$_5$.

14. A process for the preparation of hydrated mixed oxides of alumina and zirconia, according to claim 7, wherein the homogenous precipitation is carried out in the presence of urea or formamide.

15. A process, according to claim 7, wherein the reaction temperature ranges between 90° and 100° C.

16. A process for the preparation of mixed oxides of alumina and zirconia according to claim 7, wherein the starting solution of aluminum salt, polyelectrolyte, substance capable of releasing hydroxy ions under the reaction conditions, is acidified up to pH below 3, then the zirconium salt is added, and a sulphate is added in an amount equimolar with respect to the sulphuric acid of claim 7.

17. A process according to claim 7, wherein the cationic polyelectrolyte comprises repeating units based on vinylamine, having the formula:

wherein $R_4$, $R_5$, $R_6$, equal or different from each other are selected from the group comprising hydrogen, a hydrocarbon radical having from 1 to 4 carbon atoms, Y is CH$_3$ or H, X is an anion, in particular chloride or sulphate, and n is an integer.

18. A process, according to claim 17, wherein $R_4$ is H and $R_5$ and $R_6$, equal or different from each other, are selected from the group consisting of H, —CH$_3$ and —C$_2$H$_5$.

19. A process according to claim 12, wherein the polyelectrolyte also comprises, besides the ionic units, neutral units of non-substituted acrylamide having the formula:

wherein m is an integer and Y has the meaning indicated in claim 13, the ionic and neutral units being distributed statistically along the polymer chain.

20. A process according to claim 12, wherein the cationic polyelectrolyte consists of a copolymer comprising the cationic substituted acrylamide units of claim 12, or cationic vinylamine units based on vinylamide, having the formula:

wherein $R_4$, $R_5$, $R_6$ have the same meaning of $R_1$ of claim 12, X means an anion, in particular chloride or sulphate and Y and n have the meanings indicated in claim 12, and neutral units different from those of acrylamide, randomly distributed along the polymer chain.

* * * * *